(12) United States Patent
D'Aleo et al.

(10) Patent No.: US 12,328,513 B2
(45) Date of Patent: Jun. 10, 2025

(54) CODED APERTURE IMAGING SYSTEM AND METHOD

(71) Applicant: ams-OSRAM Asia Pacific Pte. Ltd., Singapore (SG)

(72) Inventors: Francesco Paolo D'Aleo, Samstagern (CH); Markus Rossi, Eindhoven (NL); Jens Geiger, Thalwil (CH)

(73) Assignee: AMS-OSRAM ASIA PACIFIC PTE. LTD., Singapore (SG)

( * ) Notice: Subject to any disclaimer, the term of this patent is extended or adjusted under 35 U.S.C. 154(b) by 178 days.

(21) Appl. No.: 18/276,988

(22) PCT Filed: Feb. 7, 2022

(86) PCT No.: PCT/SG2022/050056
§ 371 (c)(1),
(2) Date: Aug. 11, 2023

(87) PCT Pub. No.: WO2022/173370
PCT Pub. Date: Aug. 18, 2022

(65) Prior Publication Data
US 2024/0137656 A1    Apr. 25, 2024

(30) Foreign Application Priority Data
Feb. 12, 2021    (GB) ..................... 2101997

(51) Int. Cl.
*H04N 5/335*    (2011.01)
*H04N 23/20*    (2023.01)
(Continued)

(52) U.S. Cl.
CPC ............ *H04N 23/75* (2023.01); *H04N 23/20* (2023.01); *H04N 23/54* (2023.01); *H04N 23/55* (2023.01)

(58) Field of Classification Search
CPC ..................................................... H04N 23/75
See application file for complete search history.

(56) References Cited

U.S. PATENT DOCUMENTS

| 11,418,727 B2 * | 8/2022 | Graham | ................. H04N 23/75 |
| 12,147,001 B2 * | 11/2024 | Perlman | ................. H04N 23/60 |

(Continued)

FOREIGN PATENT DOCUMENTS

| JP | 2002117403 A | 4/2002 |
| JP | 2009529160 A | 8/2009 |

(Continued)

OTHER PUBLICATIONS

International Search Report issued for corresponding International Patent Application No. PCT/SG2022/050056 on May 11, 2022 (3 pages).

(Continued)

*Primary Examiner* — Gary C Vieaux
(74) *Attorney, Agent, or Firm* — VIERING, JENTSCHURA & PARTNER mbB

(57) ABSTRACT

An optical system includes a spatial encoding arrangement for generating spatially encoded light with an initial spatial distribution; a coded aperture defining a mask pattern based on the initial spatial distribution of the spatially encoded light; and—an image sensor. The spatial encoding arrangement—directs the spatially encoded light onto the object, and the object reflects at least a portion of the spatially encoded light to form reflected light. The reflected light is directed through the coded aperture to form spatially decoded light. The spatially decoded light is directed onto (Continued)

the image sensor to form an image thereon, and the image sensor detects the image. The spatial encoding arrangement includes optical emitters spatially arranged, defining the initial spatial pattern of the spatially encoded light. The mask pattern is the inverse of the initial spatial pattern of the spatially encoded light defined by the spatial arrangement of the optical emitters.

16 Claims, 3 Drawing Sheets

(51) Int. Cl.
*H04N 23/54* (2023.01)
*H04N 23/55* (2023.01)
*H04N 23/75* (2023.01)

(56) References Cited

U.S. PATENT DOCUMENTS

| | | | |
|---|---|---|---|
| 12,244,952 B2 * | 3/2025 | Liang | G03B 39/00 |
| 2009/0016481 A1 | 1/2009 | Slinger | |
| 2009/0020714 A1 | 1/2009 | Slinger | |
| 2010/0003024 A1 | 1/2010 | Agrawal et al. | |
| 2011/0079725 A1 | 4/2011 | Tobin, Jr. et al. | |
| 2011/0315855 A1 | 12/2011 | Perlman et al. | |
| 2018/0188020 A1 | 7/2018 | Fuchikami | |
| 2019/0310724 A1 | 10/2019 | Yeke Yazdandoost et al. | |
| 2020/0281451 A1 | 9/2020 | Zalevsky et al. | |

FOREIGN PATENT DOCUMENTS

| | | |
|---|---|---|
| JP | 2017015872 A | 1/2017 |
| JP | 2021517699 A | 7/2021 |
| WO | 2013/124664 A1 | 8/2013 |

OTHER PUBLICATIONS

Written Opinion issued for corresponding International Patent Application No. PCT/SG2022/050056 on May 11, 2022 (4 pages).

Search Report issued for corresponding Great Britain Patent Application No. GB2101997.1 on Nov. 11, 2021 (3 pages).

Horita et al., "Coded Aperture for Projector and Camera for Robust 3D measurement", 21st International Conference on Pattern Recognition (ICPR 2012), Nov. 11-15, 2012, Tsukuba, Japan, pp. 1487-1491 (5 pages).

Fenimore et al., "Coded aperture imaging with uniformly redundant arrays", Applied Optics, Feb. 1, 1978, vol. 17, No. 3, pp. 337-347 (11 pages).

Zhou et al., "What are Good Apertures for Defocus Deblurring?", IEEE International Conference on Computational Photography, 2009, pp. 1-8 (8 pages).

Japanese Notice of Allowance issued for the corresponding Japanese patent application No. 2023527349, dated Jun. 24, 2024, 3 pages (for informational purposes only).

Japanese Search Report by registered Organisation of corresponding Japanese patent application No. 2023-549123, dated May 29, 2024, 18 pages (for informational purposes only).

Abstract of ASIF et al., "FlatCam: Thin, Lensless Cameras Using Coded Aperture and Computation", IEEE Transactions on Computational Imaging, vol. 3, Issue 3, Sep. 2017, 1 page.

* cited by examiner

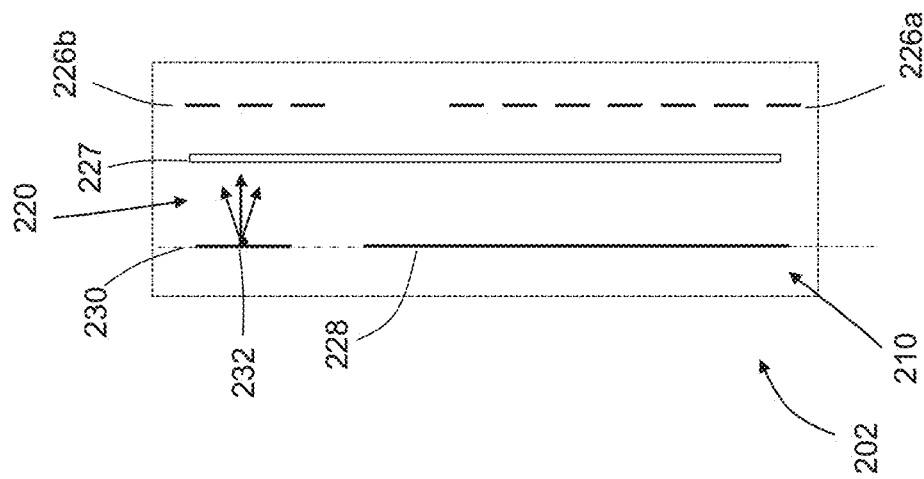
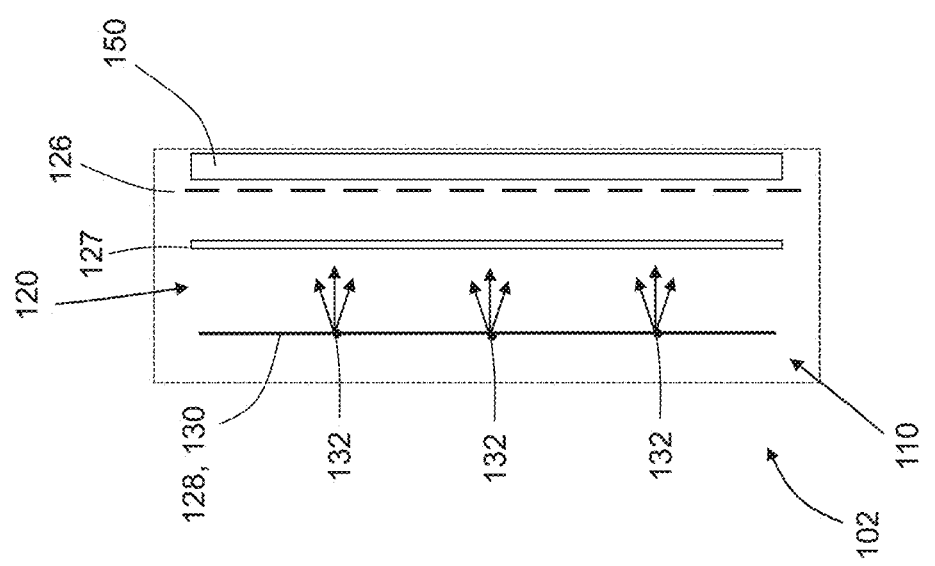

CODED APERTURE IMAGING SYSTEM AND METHOD

CROSS REFERENCE TO RELATED APPLICATION

This application is a National Stage of International Application No. PCT/SG2022/050056, filed on Feb. 7, 2022, which designates the United States and was published in English, and which claims priority to Great Britain Patent Application No. 2101997.1, filed on Feb. 12, 2021, in the Intellectual Property Office. All of the aforementioned applications are hereby incorporated by reference in their entireties.

FIELD

The present disclosure relates to a coded aperture imaging system and method for use in particular, though not exclusively, in electronic devices such as mobile and/or wearable electronic devices.

BACKGROUND

Coded aperture imaging systems and methods are known which rely upon transmitting ambient light from an object through a coded aperture to form spatially encoded light, detecting a spatial distribution of the spatially encoded light on an image sensor and reconstructing an image of the object from the detected spatial distribution of the spatially encoded light using computational techniques. Although such coded aperture imaging systems and methods are lensless, they are generally computationally intensive such that the reconstruction of the image of the object may result in unacceptable time delays for some technical applications and/or may result in prohibitive levels of power consumption for some technical applications.

Other coded aperture imaging methods are known which include transmitting light from an optical source through a coded aperture to form spatially encoded light, illuminating an object, which is at least partially transparent, using the spatially encoded light, detecting at least a portion of the spatially encoded light which is transmitted through the object, and reconstructing an image of the object from the detected spatially encoded light using computational techniques. Although such coded aperture imaging systems and methods are lensless, they are also generally computationally intensive such that the reconstruction of the image of the object may result in unacceptable time delays for some technical applications and/or may result in prohibitive levels of power consumption for some technical applications.

SUMMARY

According to an aspect of the present disclosure there is provided an optical system for imaging an object, the optical system comprising:
- a spatial encoding arrangement for generating spatially encoded light with an initial spatial distribution;
- a coded aperture defining a mask pattern which is based on the initial spatial distribution of the spatially encoded light; and
- an image sensor,
- wherein the optical system is configured such that, in use, the spatial encoding arrangement directs the spatially encoded light onto the object so that the object reflects at least a portion of the spatially encoded light to form reflected light, the reflected light is directed through the coded aperture to form spatially decoded light, the spatially decoded light is directed onto the image sensor so as to form an image thereon, and the image sensor detects the image.

In contrast to prior art coded aperture imaging systems which rely upon computational techniques to reconstruct an image of the object from spatially encoded light received from the object, such an optical system relies upon the generation of spatially encoded light with an initial spatial distribution, reflection of the spatially encoded light from the object and transmission of the reflected spatially encoded light through a coded aperture which defines a mask pattern which is based on the initial spatial distribution of the spatially encoded light. The coded aperture decodes the spatially encoded light to form spatially decoded light which forms an image on the image sensor which more closely resembles the object compared with the images of objects formed using prior art coded aperture imaging systems. Accordingly, such an optical system may eliminate, or at least reduce, the complexity of the image processing required to reconstruct an image of the object compared with prior art coded aperture imaging techniques performed using prior art coded aperture imaging systems. Accordingly, such an optical system may eliminate, or at least reduce, the computational burden associated with imaging relative to prior art coded aperture imaging systems thereby reducing imaging time/improving responsiveness and/or reducing the energy consumption for imaging relative to prior art coded aperture imaging systems.

Such an optical system may be particularly suited for use in mobile electronic devices where the availability of processing resources and the amount of energy reserves may be limited.

Unlike some prior art coded aperture imaging systems which rely upon transmission of light through the object to be imaged, such an optical system may be used for imaging an object using light reflected from the object such that there is no need for the object to transmit spatially encoded light in order to generate an image of the object.

The image detected by the image sensor may be an image of the object.

The image detected by the image sensor may be a sharp or focused image of the object.

The image detected by the image sensor may be a blurred image of the object.

The image detected by the image sensor may be a scaled image of the object.

The image detected by the image sensor may be smaller than the object.

The image detected by the image sensor may be a product of a scaled image of the object with a function which is independent of the mask pattern defined by the coded aperture.

The mask pattern may be a binary mask pattern.

The coded aperture may comprise a plurality of opaque regions and a plurality of transparent regions or apertures which together define the mask pattern.

The coded aperture may be diffractive.

The coded aperture may comprise a phase mask.

The mask pattern may be configured such that an auto-correlation of the mask pattern is equal to, or resembles, a Kronecker delta function $\delta$ which includes a central peak or lobe, but which includes no secondary peaks or side-lobes, or which includes a central peak or lobe and which includes one or more secondary peaks or side-lobes which have an amplitude which is less than $\frac{1}{10}$ an amplitude of the central peak or lobe, which is less than 1/100 an amplitude of the central peak or lobe, or which is less than 1/1000 an amplitude of the central peak or lobe.

The mask pattern may be a Uniformly Redundant Array (URA) mask pattern.

The mask pattern may be a Modified Uniformly Redundant Array (MURA) mask pattern.

The coded aperture may be reconfigurable. A reconfigurable mask pattern may allow different images of the object to be formed on the image sensor, wherein each different image corresponds to a different viewing angle of the object. A reconfigurable mask pattern may allow the mask pattern to be adjusted for optimisation of the image formed on the image sensor.

The coded aperture may be formed from, or may comprise, a plurality of reconfigurable elements, wherein each element is reconfigurable between a transparent state and a blocking or absorbing state.

The coded aperture may be formed from, or may comprise, an LCD array.

The optical system may be configured to reject or block ambient light reflected from the object.

The optical system may comprise an optical filter in front of the image sensor for rejecting or blocking ambient light reflected from the object.

The image sensor may be configured to detect infrared light.

The image sensor may be configured to have a lower sensitivity to visible light and a higher sensitivity to infrared light.

The spatially encoded light and the spatially decoded light may both comprise, or may both be formed from, infrared light. The image sensor may be configured to detect infrared light. The optical system may comprise an optical filter in front of the image sensor for rejecting or blocking visible light and for transmitting infrared light.

The optical filter may comprise, or be formed from, a dye-based polymer material.

The optical filter may comprise, or be formed from, antimony doped tin oxide.

The optical filter may be an interference filter.

The spatially encoded light may be modulated temporally with a pre-defined temporal modulation so that the spatially decoded light is also modulated temporally with the pre-defined temporal modulation. The image sensor may be configured to distinguish between the temporally modulated spatially decoded light and light which is temporally unmodulated and/or light which is modulated temporally with a temporal modulation which is different to the pre-defined temporal modulation.

The spatial encoding arrangement may comprise one or more optical emitters.

Each optical emitter may comprise a Lambertian optical emitter or a non-Lambertian optical emitter.

Each optical emitter may comprise an LED.

Each optical emitter may be configured to emit infrared light.

Each optical emitter may be modulated temporally with a pre-defined temporal modulation so that the spatially decoded light is also modulated temporally with the pre-defined temporal modulation.

The spatial encoding arrangement may comprise a single optical emitter.

The spatial encoding arrangement may comprise a plurality of optical emitters.

Each optical emitter of the plurality of optical emitters may be operable independently of the one or more other optical emitters of the plurality of optical emitters.

The spatial encoding arrangement may comprise the coded aperture and the optical system may be configured such that, in use, the one or more optical emitters emit light which passes through the coded aperture to form the spatially encoded light such that the initial spatial pattern of the spatially encoded light is defined by the mask pattern of the coded aperture.

The one or more optical emitters and the image sensor may be co-planar.

The one or more optical emitters and the image sensor may be mounted or formed on the same substrate.

The one or more optical emitters comprise a plurality of optical emitters and wherein the plurality of optical emitters are distributed across a light sensitive area of the image sensor.

The spatial encoding arrangement may comprise a further coded aperture defining the same mask pattern as the coded aperture, and wherein the optical system is configured such that, in use, the one or more optical emitters emit light which passes through the further coded aperture to form the spatially encoded light such that the initial spatial pattern of the spatially encoded light is defined by the mask pattern of the further coded aperture.

The coded aperture and the further coded aperture may be located adjacent one another.

The coded aperture and the further coded aperture may be co-planar.

The coded aperture and the further coded aperture may not be co-planar, wherein the coded aperture is positioned in front of the image sensor and the further coded aperture is positioned in front of the one or more optical emitters such that the reflected light is incident on a region of the mask pattern of the coded aperture and the light emitted by the one or optical emitters is incident on a corresponding region of the same mask pattern of the further coded aperture.

The spatial encoding arrangement may comprise a plurality of optical emitters, wherein the plurality of optical emitters are spatially arranged so as to define the initial spatial pattern of the spatially encoded light, and wherein the mask pattern defined by the coded aperture is the inverse of the initial spatial pattern of the spatially encoded light defined by the spatial arrangement of the plurality of optical emitters.

Each optical emitter of the plurality of optical emitters may absorb or block the reflected light so that each optical emitter of the plurality of optical emitters may define a corresponding opaque or blocking region of the coded aperture.

Each optical emitter of the plurality of optical emitters may be mounted, or formed, on a substrate which is transparent to the light emitted by the plurality of optical emitters.

Each optical emitter of the plurality of optical emitters may be aligned with a corresponding opaque or blocking region of the coded aperture.

Each optical emitter of the plurality of optical emitters may be mounted, or formed, on a corresponding opaque or blocking region of the coded aperture.

The spatial encoding arrangement may comprise a plurality of lens elements, wherein each lens element is aligned in front of a corresponding optical emitter so as to at least partially focus or collimate light emitted by the corresponding optical emitter.

According to an aspect of the present disclosure there is provided an electronic device comprising the optical system as described above.

The electronic device may comprise a user interface. The one or more optical emitters and the image sensor may be located behind the user interface and the object may be located in front of the user interface.

The coded aperture may be defined between the image sensor and the user interface.

The coded aperture may be defined between the user interface and the object.

The coded aperture may be defined, or formed, on the user interface.

The coded aperture may be defined by the user interface, for example wherein each opaque region of the plurality of opaque regions of the coded aperture is defined by a corresponding pixel, or group of pixels, of the user interface and each transparent region of the plurality of transparent regions is defined by a corresponding pixel, or group of pixels, of the user interface.

The user interface may comprise a display.

The user interface may comprise a touchscreen display.

The electronic device may comprise a mobile electronic device.

The electronic device may comprise a mobile phone, a cell phone, a smartphone, a tablet, a laptop, or a wearable electronic device such as an electronic watch or an electronic wristband.

The electronic device may be configured to process the image detected by the image sensor to thereby recognise one or more features of the object. For example, the object may comprise at least part of a person's finger or thumb and the electronic device may include a processing resource which is configured to process the image detected by the image sensor for the purposes of recognising or determining the proximity of the person's finger or thumb to the optical system from the detected image of at least part of the person's finger or thumb. This may be particularly advantageous for proximity "touchscreens" for small displays in which a user interacts with the "touchscreen" on an elevated virtual plane in the vicinity of the "touchscreen" to avoid or at least reduce the extent to which a user's finger or thumb obscures the display.

The object may comprise a person or part of a person and the electronic device may be configured to process the image detected by the image sensor for the purposes of recognising or identifying the person. For example, the object may comprise at least part of a person's face and the electronic device may include a processing resource which is configured to process the image detected by the image sensor for the purposes of facial recognition. The object may comprise a person's finger print or thumb print and the processing resource may be configured to process the image detected by the image sensor for the purposes of recognising or identifying the person from the image of the person's finger or thumb print.

The object may be static or moving.

The electronic device may be configured to process a plurality of images of a moving object for the recognition of one or more predetermined movements of the object. For example, the moving object may comprise at least part of a person and the electronic device may include a processing resource which is configured to process a plurality of images detected by the image sensor for the purposes of recognising or identifying one or more predetermined movements of at least part of the person e.g. a gesture.

According to an aspect of the present disclosure there is provided a method for imaging an object, the method comprising:
directing spatially encoded light with an initial spatial distribution onto an object so that the object reflects at least a portion of the spatially encoded light to form reflected light;
directing the reflected light through a coded aperture to form spatially decoded light, wherein the coded aperture defines a mask pattern which is based on the initial spatial distribution of the spatially encoded light; and
directing the spatially decoded light onto an image sensor, wherein the spatially decoded light forms an image on the image sensor and the image sensor detects the image.

The method may comprise spatially encoding light emitted by one or more optical emitters to form the spatially encoded light.

The method may comprise spatially encoding light emitted by a single optical emitter to form the spatially encoded light.

The method may comprise spatially encoding light emitted by a plurality of optical emitters to form the spatially encoded light.

The method may comprise arranging the plurality of optical emitters so as to form the spatially encoded light.

The method may comprise operating different optical emitters of the plurality of optical emitters at different times so as to illuminate the object from different directions and/or to illuminate different parts of the object at different times to thereby form different images of the object when viewed from different directions and/or to thereby form images of different parts of the object.

It should be understood that any one or more of the features of any one of the foregoing aspects of the present disclosure may be combined with any one or more of the features of any of the other foregoing aspects of the present disclosure.

BRIEF DESCRIPTION OF THE DRAWINGS

An optical system and method will now be described by way of non-limiting example only with reference to the accompanying drawings of which:

FIG. 2 schematically illustrates a first alternative electronic device which includes a first alternative optical system for imaging an object;

FIG. 3 schematically illustrates a second alternative electronic device which includes a second alternative optical system for imaging an object;

DETAILED DESCRIPTION OF THE DRAWINGS

Figure 1B:
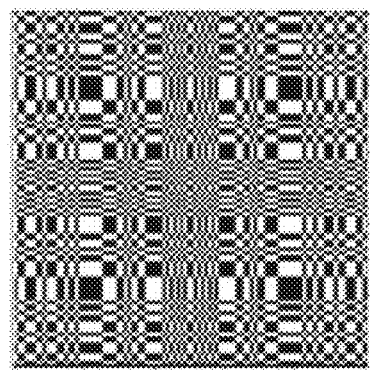
FIG. 1B shows a Modified Uniformly Redundant Array (MURA) binary mask pattern defined by a coded aperture of the optical system of the electronic device of FIG. 1A.
Figure 1C:
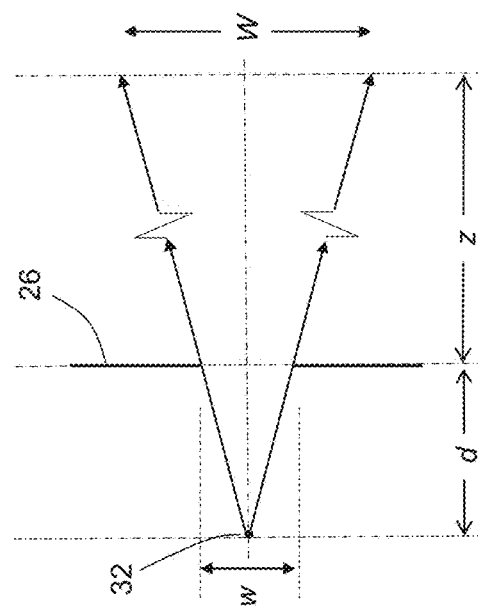
FIG. 1C schematically illustrates the projection of a point source of an illuminator of the optical system of the electronic device of FIG. 1A through an aperture of the coded aperture of the optical system of the electronic device of FIG. 1A.
Figure 1A:
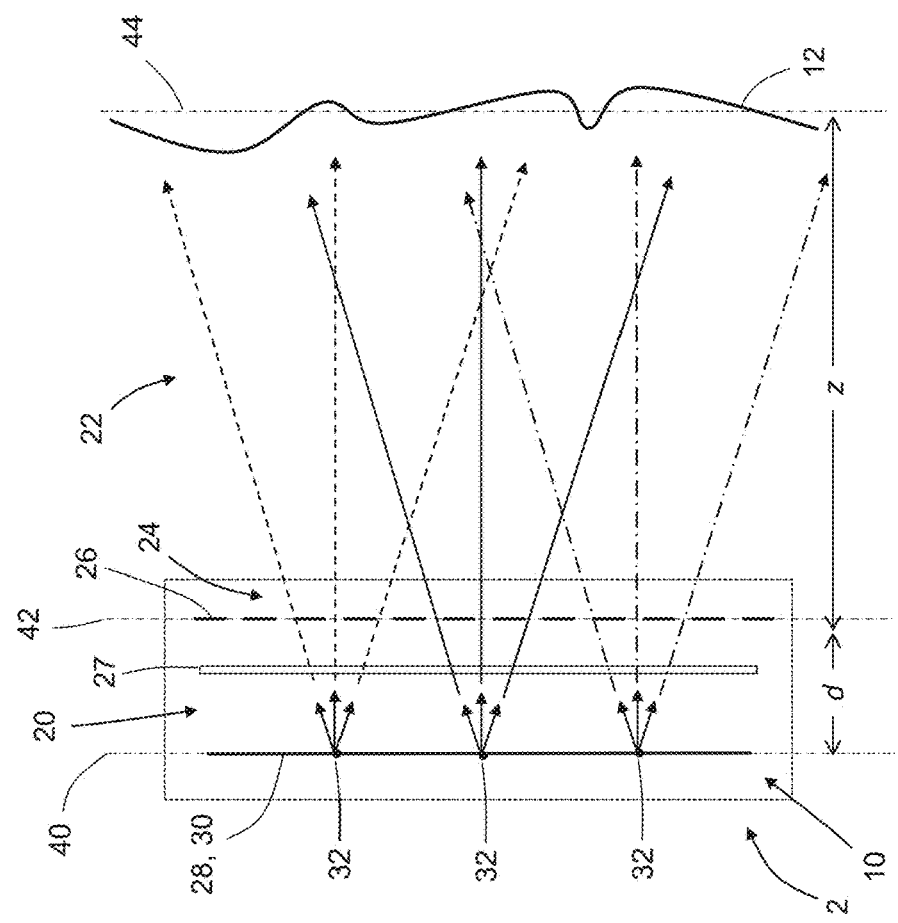
FIG. 1A schematically illustrates an electronic device which includes an optical system for imaging an object.

Referring initially to FIG. 1A there is shown an electronic device in the form of a smartphone generally designated 2. The smartphone 2 includes an optical system generally designated 10 for imaging an object 12 in a scene external to the smartphone 2. The optical system 10 may, for example, form at least part of a rear-facing camera of the smartphone 2 for imaging the object 12. The optical system 10 includes a spatial encoding arrangement generally designated 20 for generating spatially encoded light 22 with an initial spatial distribution 24, a coded aperture 26, an optical filter 27 for transmitting infrared light and for rejecting or blocking visible light, and an image sensor 28. As shown in FIG. 1B, the coded aperture 26 defines a Modified Uniformly Redundant Array (MURA) binary mask pattern defined by a plurality of opaque regions and a plurality of transparent regions or apertures.

The spatial encoding arrangement 20 includes a Lambertian illuminator generally designated 30 in the form of one or more infrared LEDs 32 which are integrated with, and distributed across, a light sensitive area of the image sensor 28. Moreover, in the particular optical system 10 of FIG. 1A, the spatial encoding arrangement 20 further includes the coded aperture 26 such that the initial spatial distribution 24 of the spatially encoded light 22 generated by the spatial encoding arrangement 20 is determined or governed, at least in part by the MURA mask pattern of the coded aperture 26. As such, the MURA mask pattern defined by the coded aperture 26 may be considered to be based on the initial spatial pattern 24 of the spatially encoded light 22 which is generated by the spatial encoding arrangement 20. As indicated in FIG. 1A, the illuminator 30 and the image sensor 28 are generally located on, or arranged about, an illuminator/image sensor plane 40, the coded aperture 26 is generally located on, or arranged about, a coded aperture plane 42, and the object 12 is generally located on, or arranged about, an object plane 44. As indicated in FIG. 1A, the illuminator/image sensor plane 40 and the coded aperture plane 42 are separated by a distance B and the coded aperture plane 42 and the object plane 44 are separated by a distance z.

In use, the illuminator 30 emits infrared light which passes through the optical filter 27 and the coded aperture 26 to form the spatially encoded light 22 with the initial spatial distribution 24. The optical system 10 is configured such that, in use, the spatial encoding arrangement 20 directs the spatially encoded light 22 onto the object 12 and the object 12 reflects at least a portion of the spatially encoded light 22 to form reflected light which is directed back through the coded aperture 26 to form spatially decoded light which is transmitted through the optical filter 27 and is incident on the image sensor 28. The spatially decoded light forms an image on the image sensor 28 and the image sensor 28 detects the image. For the reasons explained in detail below, the image formed on the image sensor 28 more closely resembles the object 12 compared with the images of objects formed using prior art coded aperture imaging systems. Consequently, use of the optical system 10 for imaging eliminates, or at least reduces, the complexity of the processing required to reconstruct an image of the object 12 compared with prior art coded aperture imaging techniques performed using prior art coded aperture imaging systems.

By way of a simplified explanation of the principle of operation of the optical system 10, the irradiance distribution $I_O$ of the spatially encoded light 22 which illuminates the object 12 may be considered to be a convolution of a radiant exitance distribution $I_E$ generated by the Lambertian illuminator 30 and the transmission function A of the mask pattern defined by the coded aperture 26 i.e. the irradiance distribution $I_O$ of the spatially encoded light 22 which illuminates the object 12 may be expressed as $I_O=I_E*A$ where "*" represents the convolution operation. If $R_O$ is the reflectivity of the object 12 as a function of a transverse position across the object, the irradiance reflected by the object 12 is given by $I_O \cdot R_O = (I_E*A) \cdot R_O$. The image formed on the image sensor 28 by the spatially decoded light after the reflected irradiance $(I_E*A) \cdot R_O$ passes back through the coded aperture 26 may be considered to be a convolution of the reflected irradiance $(I_E*A) \cdot R_O$ and the transmission function A of the mask pattern i.e. the spatially decoded light incident on the image sensor 28 is given by $[(I_E*A) \cdot R_O]*A = I_E*A*A \cdot R_O$. The transmission function A defined by the MURA mask pattern of the coded aperture 26 is configured such that $A*A=\delta$ i.e. such that the autocorrelation of the transmission function A of the MURA mask pattern is, or at least approximates, a two-dimensional Kronecker delta function. Moreover, for the special case where the radiant exitance distribution $I_E$ generated by the Lambertian illuminator 30 is, or resembles, a point source, $I_E$ may also be approximated by a two-dimensional Kronecker delta function i.e. $I_E \approx \delta$. Consequently, the spatial distribution of the spatially decoded light incident on the image sensor 28 when the Lambertian illuminator 30 is, or resembles, a point source, is given by $R_O$ i.e. for the special case where the radiant exitance distribution $I_E$ generated by the Lambertian illuminator 30 is, or resembles, a point source, the spatially decoded light incident on the image sensor 28 forms an image which approximates the reflectivity of the object 12 as a function of a transverse position across the object 12. In other words, the spatially decoded light incident on the image sensor 28 forms an image of the object 12 on the image sensor 28 which is independent of the MURA mask pattern of the coded aperture 26. One of skill in the art will understand that the foregoing simplified explanation of the principle of operation of the optical system 10 applies to the special case where the radiant exitance distribution $I_E$ generated by the Lambertian illuminator 30 is, or resembles, a point source and does not take into account blur or magnification of the illuminator 30 or the transparent regions or apertures of the MURA mask pattern. A more general, more detailed explanation of the principle of operation of the optical system 10 is provided below.

In general, the irradiance distribution $I_O$ of the spatially encoded light 22 which illuminates the object 12 is given by:

$$I_O = m_{tE}(I_E) * m_{tA}(A) * b_t \qquad \text{Equation 1}$$

where $m_{tE}$ represents a magnified irradiance distribution associated with the projection of the radiant exitance distribution $I_E$ generated by the Lambertian illuminator 30 from the plane 40 of the illuminator 30 through the mask pattern defined by the coded aperture 26 onto the object plane 44, $m_{tA}$ represents a magnification function associated with the projection of one of the transparent regions or apertures of the transmission function A of the MURA mask pattern from the coded aperture plane 42 onto the object plane 44, $b_t$ represents a blur function associated with the projection of a point source in the plane 40 of the illuminator 30 onto the object plane 44, and "*" represents the convolution operation.

Specifically, if $\vec{r}$ is the transverse position in the plane 40 of the Lambertian illuminator 30, and the radiant exitance distribution $I_E$ generated by the Lambertian illuminator 30 as a function of the transverse position in the plane 40 of the Lambertian illuminator 30 is represented by $I_E(\vec{r})$, $m_{tE}$ is defined by:

$$m_{tE}[I_E(\vec{r})] = I_E(M_{tE} \cdot \vec{r}) \qquad \text{Equation 2}$$

where $M_{tE}$ represents a magnification factor associated with the magnification of the irradiance distribution $I_E(\vec{r})$ generated by the Lambertian illuminator 30 from the plane 40 of the Lambertian illuminator 30 through a pin-hole in the coded aperture plane 42 onto the object plane 44. Specifically, from simple pin-hole camera theory, the magnification factor $M_{tE}$ is given by:

$$M_{tE} = \frac{z}{d} \qquad \text{Equation 3}$$

Similarly, if $\vec{r}$ is the transverse position in the coded aperture plane 42, and the transmission of the MURA mask pattern defined by the coded aperture 26 as a function of the transverse position in the coded aperture plane 42 is represented by $A(\vec{r})$, $m_{tA}$ is defined by:

$$m_{tA}[A(\vec{r})] = A(M_{tA} \cdot \vec{r}) \qquad \text{Equation 4}$$

where $M_{tA}$ represents a magnification factor associated with the projection of one of the transparent regions or apertures of the MURA mask pattern having a diameter w from the coded aperture plane 42 to a diameter W in the object plane 44 as illustrated in FIG. 1C. Specifically, the projection W of one of the transparent regions or apertures of the MURA mask pattern having a diameter w is given by:

$$\frac{\frac{w}{2}}{d} = \frac{\frac{W}{2}}{d+z} \qquad \text{Equation 5}$$

which may be re-arranged to give the desired magnification factor $M_{tA}$ according to:

$$M_{tA} = \frac{W}{w} = 1 + \frac{z}{d} \qquad \text{Equation 6}$$

The blur function $b_t$ accounts for the projection or blurring of a point source in the plane 40 of the illuminator 30 onto a spot in the object plane 44. Specifically, with reference to FIG. 1C, the degree of blur experienced by a point source in the plane 40 of the illuminator 30 is given by a blur factor $B_t$ defined by the relation:

$$B_t \propto W = \frac{wz}{d} \qquad \text{Equation 7}$$

where W represents a dimension of the spot formed in the object plane 44 as a consequence of the projection of light emitted from a point source in the plane 40 of the illuminator 30 through a transparent region or aperture of the coded aperture 26 having a dimension of w.

The blur factor $B_t$ may also include a contribution of the diffraction blur given by:

$$B_t \propto \frac{d \cdot \lambda}{(w^2/4)} \qquad \text{Equation 8}$$

where $\lambda$ is the wavelength of the Lambertian illuminator 30.

If $R_O$ is the reflectivity of the object 12 as a function of a transverse position in the object plane 44, the irradiance reflected by the object 12 is given by:

$$I_O \cdot R_O = [m_{tE}(I_E) * m_{tA}(A) * b_t] \cdot R_O \qquad \text{Equation 9}$$

The irradiance distribution $I_S$ of the spatially decoded light which is incident on the image sensor 28 after transmission of the reflected irradiance $I_O \cdot R_O$ back through the coded aperture 26 is then given by:

$$I_S = m_{rO}(I_O \cdot R_O) * m_{rA}(A) * b_r \qquad \text{Equation 10}$$

where $m_{rO}$ represents a magnified irradiance distribution associated with the projection of the reflected irradiance $I_O \cdot R_O$ reflected by the object 12 back through the mask pattern defined by the coded aperture 26 onto the image sensor plane 40, $m_{rA}$ represents a magnification function associated with the projection of one of the transparent regions or apertures of the transmission function A of the mask pattern from the coded aperture plane 42 onto the image sensor plane 40, $b_r$ represents a blur function associated with the projection of a point source in the object plane 44 onto the image sensor plane 40, and "*" represents the convolution operation.

Specifically, if $\vec{r}$ is the transverse position in the object plane 44, and the irradiance $I_O R_O$ reflected by the object 12 as a function of the transverse position in the object plane 44 is represented by $I_O R_O(\vec{r})$, $m_{rO}$ is defined by:

$$m_{rO}[I_O R_O(\vec{r})] = I_O R_O(M_{rO} \cdot \vec{r}) \qquad \text{Equation 11}$$

where $M_{rO}$ represents a magnification factor associated with the magnification of the reflected irradiance distribution $I_O R_O(\vec{r})$ from the object plane 44 through a pin-hole in the coded aperture plane 42 onto the image sensor plane 40. Specifically, from simple pin-hole camera theory, the magnification factor $M_{rO}$ is given by:

$$M_{rO} = \frac{d}{z} \qquad \text{Equation 12}$$

Similarly, if $\vec{r}$ is the transverse position in the coded aperture plane 42, and the transmission of the mask pattern defined by the coded aperture 26 as a function of the transverse position in the coded aperture plane 42 is represented by $A(\vec{r})$, $m_{rA}$ is defined by:

$$m_{rA}[A(\vec{r})] = A(M_{rA} \cdot \vec{r}) \qquad \text{Equation 13}$$

where $M_{rA}$ represents a constant magnification factor associated with the projection of one of the transparent regions or apertures of the mask pattern having a diameter w from the coded aperture plane 42 to a diameter W' in the image sensor plane 40. Specifically, the projection W' of one of the transparent regions or apertures of the mask pattern having a diameter w onto the image sensor plane 40 is given by:

$$\frac{\frac{w}{2}}{z} = \frac{\frac{W'}{2}}{d+z} \qquad \text{Equation 14}$$

which may be re-arranged to give the desired magnification factor $M_{rA}$ according to:

$$M_{rA} = \frac{W'}{w} = 1 + \frac{d}{z} \qquad \text{Equation 15}$$

The blur function $b_r$ accounts for the projection or blurring of a point source in the object plane 44 onto the image sensor plane 40. Specifically, the degree of blur experienced by a point source in the object plane 44 is given by a blur factor $B_r$ defined by the relation:

$$B_r \propto W' = \frac{wd}{z} \qquad \text{Equation 16}$$

where W' represents a dimension of the spot formed in the image sensor plane 40 as a consequence of the projection of light emitted from a point source in the object plane 44 through a transparent region or aperture of the coded aperture 26 having a dimension of w.

The blur factor $B_r$ may also include a contribution of the diffraction blur given by:

$$B_r \propto \frac{z \cdot \lambda}{(w^2/4)} \qquad \text{Equation 17}$$

where $\lambda$ is the wavelength of the Lambertian illuminator 30.

The irradiance distribution $I_S$ of the spatially decoded light which is incident on the image sensor 28 is given by:

$$I_S = m_{rO}\{[m_{tE}(I_E) * m_{tA}(A) * b_t] \cdot R_O\} * m_{rA}(A) * b_r \qquad \text{Equation 18}$$

$$= \{m_{rO}[m_{tE}(I_E)] * m_{rO}[m_{tA}(A)] * m_{rO}(b_t)\} \cdot$$

$$m_{rO}(R_O) * (m_{rA}(A) * b_r$$

For the case where z>>d:

$$M_{tA} \approx \frac{z}{d} = M_{tE} = M_t \qquad \text{Equation 19}$$

$$M_{rO} = \frac{z}{d} = \frac{1}{M_{tE}} = \frac{1}{M_t} \qquad \text{Equation 20}$$

$$M_{rA} \approx 1 \qquad \text{Equation 21}$$

$$B_r \ll B_t \qquad \text{Equation 22}$$

Hence:

$$m_{rO}[m_{tE}(I_E)] = I_E \qquad \text{Equation 23}$$

$$m_{rO}[m_{tA}(A)] = A \qquad \text{Equation 24}$$

$$M_{rA}(A) \approx A \qquad \text{Equation 25}$$

$$b_r \approx \delta \qquad \text{Equation 26}$$

and $$I_S \approx [I_E * A * m_{rO}(b_t) \cdot m_{rO}(R_O) * A * \delta \qquad \text{Equation 27}$$

$$= [I_E * A * A * m_{rO}(b_t)] \cdot m_{rO}(R_O)$$

Since the transmission function A defined by the MURA mask pattern of the coded aperture 26 is configured such that A*A=δ i.e. such that the auto-correlation of the transmission function A of the MURA mask pattern is, or at least approximates, a two-dimensional Kronecker delta function, the irradiance distribution $I_S$ of the spatially decoded light which is incident on the image sensor 28 is given by:

$$I_S \approx [I_E * m_{rO}(b_t)] \cdot m_{rO}(R_O) \qquad \text{Equation 28}$$

In other words, the spatially decoded light detected by the image sensor 28 forms an image which is a product of the magnified reflectivity $m_{rO}(R_O)$ distribution of the object 12 with a predictable function $I_E * m_{rO}(b_t)$ which is independent of the transmission function A defined by the MURA mask pattern of the coded aperture 26. Thus, for the general case of a Lambertian illuminator 30 which is distributed (i.e. not a point source), the image $R_O$ of the object 12 may be obtained from knowledge of the irradiance distribution $I_E$ generated by the Lambertian illuminator 30 and of the blur function $b_t$, but without any knowledge of the transmission function A of the MURA mask pattern of the coded aperture 26. In effect, this means that the image $R_O$ of the object 12 may be obtained more rapidly and with less energy than the deconvolution operations associated with prior art coded aperture imaging techniques.

The irradiance distribution $I_E$ generated by the Lambertian illuminator 30 may be estimated from knowledge of the design or construction of the Lambertian illuminator 30. Additionally or alternatively, the irradiance distribution $I_E$ generated by the Lambertian illuminator 30 may be measured, for example before the Lambertian illuminator 30 is assembled with the coded aperture 26 and/or before the Lambertian illuminator 30 is fitted into the smartphone 2.

The blur function $b_t$ may be determined using an iterative trial and error approach so as to minimise the degree of blur of the obtained image $R_O$ of the object 12. Alternatively, the blur function $b_t$ may be calculated using the blur factor:

$$B_t \propto W = \frac{wz}{d} \qquad \text{Equation 29}$$

where w is known from the design or construction of the coded aperture 26, d is known from the design or construction of the spatial encoding arrangement 20 of the optical system 10, and z may be estimated. Alternatively, z may be measured, for example using a phase- or frequency-shift or time of flight measurement method.

For the special case where the radiant exitance distribution $I_E$ generated by the Lambertian illuminator 30 is, or resembles, a point source, the radiant exitance distribution $I_E$ may be considered to be a two-dimensional Kronecker delta function such that the irradiance distribution $I_S$ of the spatially decoded light which is incident on the image sensor 28 is given by:

$$I_S \approx [\delta * m_{rO}(b_t)] \cdot m_{rO}(R_O) \qquad \text{Equation 30}$$

$$\approx m_{rO}(b_t) \cdot m_{rO}(R_O)$$

In other words, for the special case where the radiant exitance distribution $I_E$ generated by the Lambertian illuminator 30 is, or resembles, a point source, the spatially decoded light detected by the image sensor 28 is a product of the reflectivity $R_O$ of the object 12 as a function of a transverse position across the object 12 and a predictable function $m_{rO}(b_t)$ which depends on blur but which is independent of the transmission function A of the MURA mask pattern of the coded aperture 26. Thus, for a point source Lambertian illuminator 30, the image $R_O$ of the object 12 may be obtained from knowledge of the blur function $b_t$ without any knowledge of the transmission function A of the MURA mask pattern of the coded aperture 26, where the blur function $b_t$ may be determined using any of the methods described above.

In contrast to prior art coded aperture imaging systems which rely upon computational techniques to reconstruct an image of the object from spatially encoded light received from the object, the image formed on the image sensor 28 more closely resembles the object 12 compared with the images of objects formed using prior art coded aperture imaging systems. Consequently, use of the optical system 10 eliminates, or at least reduces, the complexity of the image processing required to reconstruct an image of the object 12 compared with prior art coded aperture imaging techniques performed using prior art coded aperture imaging systems. Accordingly, such an optical system 10 may eliminate, or at least reduce, the computational burden associated with imaging relative to prior art coded aperture imaging systems thereby reducing imaging time/improving responsiveness and/or reducing the energy consumption for imaging relative to prior art coded aperture imaging systems.

The smartphone 2 may be configured to process the image detected by the image sensor 28 to thereby recognise one or more features of the object 12. For example, the smartphone 2 may include a processing resource (not shown) which is configured to process the image detected by the image sensor 28 to thereby recognise one or more features of the object 12. The object 12 may comprise at least part of a person's finger or thumb and the processing resource may be configured to process the image detected by the image sensor 28 for the purposes of recognising or determining the proximity of the person's finger or thumb to the optical system 10 from the detected image of at least part of the person's finger or thumb. This may be particularly advantageous for proximity "touchscreens" for small displays in which a user interacts with the "touchscreen" on an elevated virtual plane in the vicinity of the "touchscreen" to avoid or at least reduce the extent to which a user's finger or thumb obscures the display.

The object 12 may comprise a person or part of a person and the smartphone 2 may be configured to process the image detected by the image sensor 28 for the purposes of recognising or identifying the person from the image of the object 12. For example, the object 12 may comprise at least part of a person's face and the smartphone 2 may include a processing resource (not shown) which is configured to process the image detected by the image sensor 28 for the purposes of facial recognition. The object 12 may comprise a person's finger print or thumb print and the processing resource may be configured to process the image detected by the image sensor 28 for the purposes of recognising or identifying the person from the image of the person's finger print or thumb print.

The smartphone 2 may be configured to process a plurality of images of a moving object for the recognition of one or more predetermined movements of the object. For example, the moving object may comprise at least part of a person and the smartphone 2 may include a processing resource (not shown) which is configured to process a plurality of images detected by the image sensor 28 for the purposes of recognising or identifying one or more predetermined movements of at least part of the person e.g. a gesture.

Referring to FIG. 2 there is shown a first alternative electronic device in the form of a smartphone generally designated 102. The smartphone 102 includes a touchscreen 150 and a first alternative optical system generally designated 110 located behind the touchscreen 150 and configured for imaging an object (not shown) in a scene external to the smartphone 102. The optical system 110 may, for example, form at least part of a front-facing camera of the smartphone 102 for imaging an object in a scene in front of the touchscreen 150. The optical system 110 includes a spatial encoding arrangement generally designated 120 for generating spatially encoded light, a coded aperture 126, an optical filter 127 for transmitting infrared light and for rejecting or blocking visible light, and an image sensor 128. The coded aperture 126 defines a MURA binary mask pattern defined by a plurality of opaque regions and a plurality of transparent regions or apertures. The touchscreen 150 is transparent to the spatially encoded light generated by the spatial encoding arrangement 120. Specifically, the spatial encoding arrangement 120 includes a Lambertian illuminator generally designated 130 in the form of one or more infrared LEDs 132 which are integrated with, and distributed across, a light sensitive area of the image sensor 128 and the touchscreen 150 is transparent to the infrared light generated by the LEDs 132. Moreover, in the particular optical system 110 of FIG. 2, the spatial encoding arrangement 120 further includes the coded aperture 126 such that the initial spatial distribution of the spatially encoded light generated by the spatial encoding arrangement 120 is determined or governed, at least in part by the MURA mask pattern of the coded aperture 126. As such, the MURA mask pattern defined by the coded aperture 126 may be considered to be based on the initial spatial pattern of the spatially encoded light which is generated by the spatial encoding arrangement 120. In all other respects and in use, the optical system 110 of the smartphone 102 of FIG. 2 is identical to the optical system 10 of the smartphone 2 of FIG. 1A.

The smartphone 102 may be configured to process the image detected by the image sensor 128 to thereby recognise one or more features of the object 112. For example, the smartphone 102 may include a processing resource (not shown) which is configured to process the image detected by the image sensor 128 to thereby recognise one or more features of the object 112. The object 112 may comprise at least part of a person's finger or thumb and the processing resource may be configured to process the image detected by the image sensor 128 for the purposes of recognising or determining the proximity of the person's finger or thumb to the optical system 110 from the detected image of at least part of the person's finger or thumb. This may be particularly advantageous for proximity "touchscreens" for small displays in which a user interacts with the "touchscreen" on an elevated virtual plane in the vicinity of the "touchscreen" to avoid or at least reduce the extent to which a user's finger or thumb obscures the display.

The object 112 may comprise a person or part of a person and the smartphone 102 may be configured to process the image detected by the image sensor 128 for the purposes of recognising or identifying the person from the image of the object 112. For example, the object 112 may comprise at least part of a person's face and the smartphone 102 may include a processing resource (not shown) which is configured to process the image detected by the image sensor 128 for the purposes of facial recognition. The object 112 may comprise a person's finger print or thumb print and the processing resource may be configured to process the image of the person's finger print or thumb print for the purposes of recognising or identifying the person from the image of the person's finger print or thumb print.

The smartphone 102 may be configured to process a plurality of images of a moving object for the recognition of one or more predetermined movements of the object. For example, the moving object may comprise at least part of a person and the smartphone 102 may include a processing resource (not shown) which is configured to process a plurality of images detected by the image sensor 128 for the purposes of recognising or identifying one or more predetermined movements of at least part of the person e.g. a gesture.

Referring to FIG. 3 there is shown a second alternative electronic device in the form of a smartphone generally designated 202. The smartphone 202 includes a second alternative optical system generally designated 210 for imaging an object (not shown) in a scene external to the smartphone 202. The optical system 210 may, for example, form at least part of a rear-facing camera of the smartphone 202 for imaging the object. The optical system 210 includes a spatial encoding arrangement generally designated 220 for generating spatially encoded light, a coded aperture 226a, an optical filter 227 for transmitting infrared light and for rejecting or blocking visible light, and an image sensor 228. The coded aperture 226a defines a MURA binary mask pattern defined by a plurality of opaque regions and a plurality of transparent regions or apertures.

The spatial encoding arrangement 220 includes a Lambertian illuminator generally designated 230 in the form of one or more infrared LEDs 232. However, unlike the spatial encoding arrangement 20 of the optical system 10 of FIG. 1A, the Lambertian illuminator 230 of the spatial encoding arrangement 220 of the optical system 210 of FIG. 3 is separate from, but located in the same plane as, the image sensor 228. The spatial encoding arrangement 220 includes a further coded aperture 226b which defines the same MURA binary mask pattern as the coded aperture 226a such that the initial spatial distribution of the spatially encoded light generated by the spatial encoding arrangement 220 is determined or governed, at least in part by the MURA mask pattern of the further coded aperture 226b. Since the MURA mask pattern defined by the further coded aperture 226b is the same as the MURA mask pattern defined by the coded aperture 226a, the MURA mask pattern defined by the coded aperture 226a may be considered to be based on the initial spatial pattern of the spatially encoded light which is generated by the spatial encoding arrangement 220 which includes the further coded aperture 226b. In all other respects and in use, the optical system 210 of the smartphone 202 of FIG. 3 is identical to the optical system 10 of the smartphone 2 of FIG. 1A.

In a variant of the optical system 210 of the smartphone 202 of FIG. 3, the coded aperture 226a and the further coded aperture 226b may not be co-planar, but wherein the coded aperture 226a is positioned in front of the image sensor 228 and the further coded aperture 226b is positioned in front of the one or more optical emitters 232 of the illuminator 230 such that the reflected light is incident on a region of the mask pattern of the coded aperture 226a and the light emitted by the one or optical emitters 232 of the illuminator 230 is incident on a corresponding region of the same mask pattern of the further coded aperture 226b.

Figure 4B:
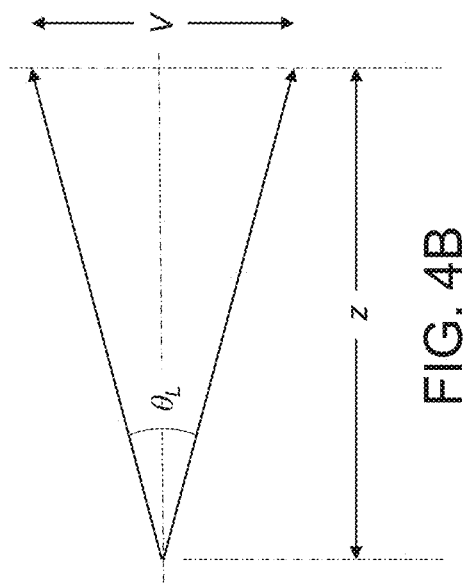
FIG. 4B schematically illustrates the projection of a point source of an illuminator of the optical system of the third alternative electronic device of FIG. 4A.
Figure 4C:
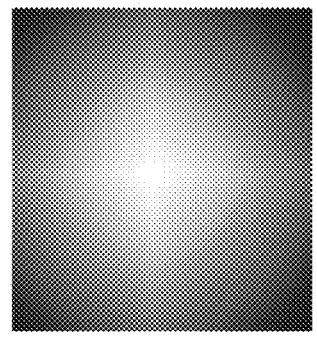
FIG. 4C shows a pyramid function.
Figure 4A:
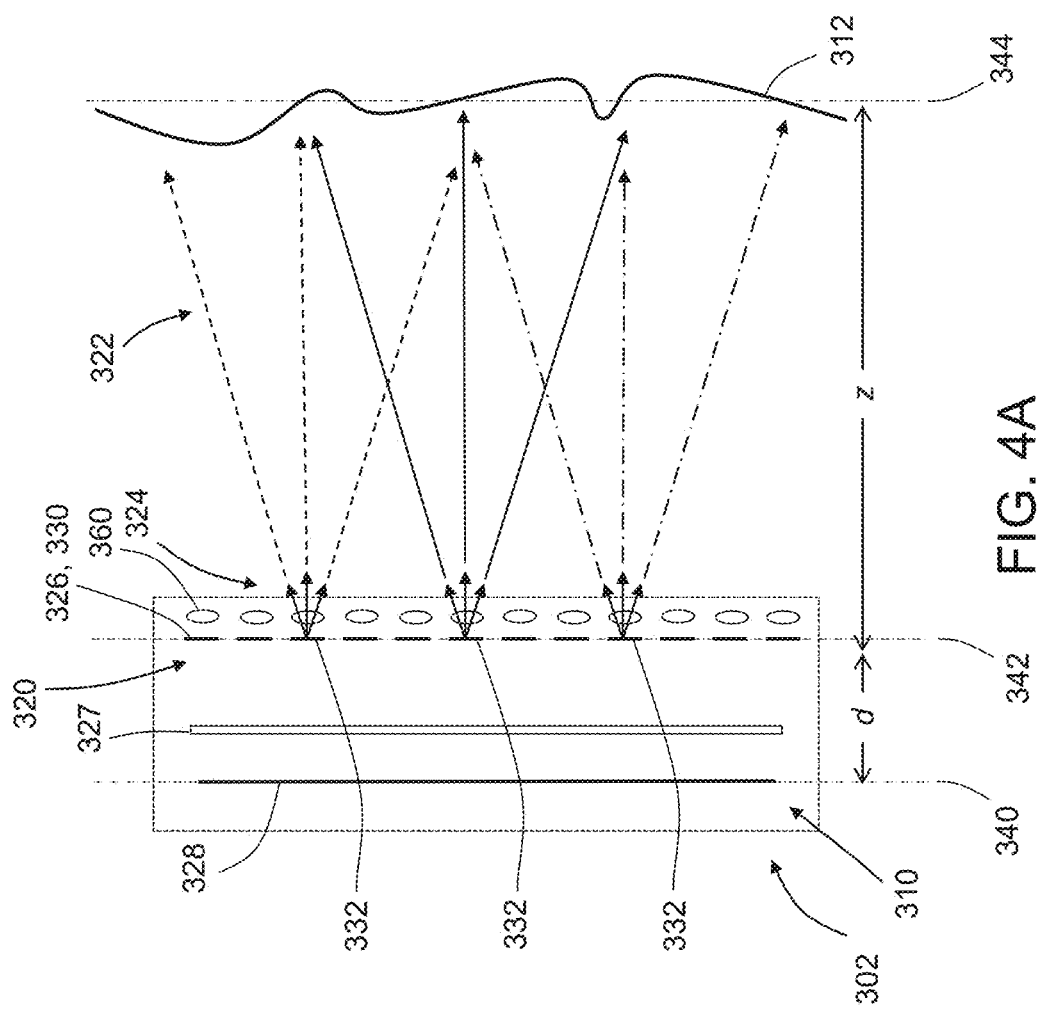
FIG. 4A schematically illustrates a third alternative electronic device which includes a third alternative optical system for imaging an object.

Referring now to FIG. 4A there is shown a third alternative electronic device in the form of a smartphone generally designated 302. The smartphone 302 includes an optical system generally designated 310 for imaging an object 312 in a scene external to the smartphone 302. The optical system 310 may, for example, form at least part of a rear-facing camera of the smartphone 302 for imaging the object 312. The optical system 310 includes a spatial encoding arrangement generally designated 320 for generating spatially encoded light 322 with an initial spatial distribution 324, a coded aperture 326, an optical filter 327 for transmitting infrared light and for rejecting or blocking visible light, and an image sensor 328.

Like the coded aperture 26 of the optical system 10 of FIGS. 1A and 1B, the coded aperture 326 defines a MURA binary mask pattern. However, unlike the coded aperture 26 of the optical system 10 of FIGS. 1A and 1B, in the optical system 310 of FIG. 4A, the spatial encoding arrangement 320 includes a Lambertian illuminator generally designated 330 in the form of a plurality of infrared LEDs 332 which define the MURA mask pattern of the coded aperture 326. Specifically, the plurality of infrared LEDs 332 are distributed across a transparent substrate in the MURA mask pattern such that the LEDs 332 define the opaque or blocking regions of the MURA mask pattern and the gaps between the LEDs 332 define the transparent regions of the MURA mask pattern. The spatial encoding arrangement 320 further includes a plurality of lens elements 360, wherein each lens element is aligned with a corresponding LED 332 for collimating the light emitted by the LED 332. Consequently, in the optical system 310 of FIG. 4A, the initial spatial distribution 324 of the spatially encoded light 322 generated by the spatial encoding arrangement 320 is determined or governed, at least in part by the MURA mask pattern defined by the LEDs 332. As indicated in FIG. 4A, the image sensor 328 is generally located on, or arranged about, an image sensor plane 340, the LEDs 332 are generally located on, or arranged about, a coded aperture plane 342, and the object 312 is generally located on, or arranged about, an object plane 344. As indicated in FIG. 4A, the image sensor plane 340 and the coded aperture plane 342 are separated by a distance d and the coded aperture plane 342 and the object plane 344 are separated by a distance z.

In use, the LEDs 332 emit infrared light with a spatial distribution which is the inverse of the MURA mask pattern to form the spatially encoded light 322 with the initial spatial distribution 324. The optical system 310 is configured such that, in use, the spatial encoding arrangement 320 directs the spatially encoded light 322 onto the object 312 and the object 312 reflects at least a portion of the spatially encoded light 322 to form reflected light which is directed back through the transparent regions of the MURA mask pattern defined by the gaps between the LEDs 332 to form spatially decoded light which is transmitted through the optical filter 327 and is incident on the image sensor 328. The spatially decoded light forms an image on the image sensor 328 and the image sensor 328 detects the image. For the reasons explained in detail below, the image formed on the image sensor 328 more closely resembles the object 312 compared with the images of objects formed using prior art coded aperture imaging systems. Consequently, use of the optical system 310 for imaging eliminates, or at least reduces, the complexity of the processing required to reconstruct an image of the object 312 compared with prior art coded aperture imaging techniques performed using prior art coded aperture imaging systems.

In general, the irradiance distribution $I_O$ of the spatially encoded light 322 which illuminates the object 312 is given by:

$$I_O = m_r[I \cdot (1-A)] \qquad \text{Equation 31}$$

where it is assumed that each of the LEDs 332 of the Lambertian illuminator 330 generates the same radiant exitance I, A represents the transmission function of the MURA mask pattern of the coded aperture 326 defined by the LEDs 332, and $m_r$ is a magnification function which accounts for the divergence of light from a point source in the plane 342 of the illuminator 330 onto a spot in the object plane 344. Specifically, with reference to FIG. 4B, after a distance z, light diverges from a point source in the plane 342 of the illuminator 330 to a spot of dimension V given by:

$$V = 2z\tan\left(\frac{\theta_L}{2}\right) \qquad \text{Equation 32}$$

If $R_O$ is the reflectivity of the object 312 as a function of a transverse position in the object plane 344, the irradiance reflected by the object 312 is given by:

$$I_O \cdot R_O = m_r[I \cdot (1-A)] \cdot R_O \qquad \text{Equation 33}$$

The irradiance distribution $I_S$ of the spatially decoded light which is incident on the image sensor 328 after transmission of the reflected irradiance $I_O \cdot R_O$ through the coded aperture 326 is then given by:

$$I_S = m_{rO}(I_O \cdot R_O) * m_{rA}(A) * b_r \qquad \text{Equation 34}$$

where $m_{rO}$ represents a magnified irradiance distribution associated with the projection of the reflected irradiance $I_O \cdot R_O$ reflected by the object 312 through the mask pattern defined by the coded aperture 326 onto the image sensor plane 340, $m_{rA}$ represents a magnification function associated with the projection of one of the transparent regions or apertures of the mask pattern from the coded aperture plane 342 onto the image sensor plane 340, $b_r$ represents a blur function associated with the projection of a point source in the object plane 344 onto the image sensor plane 340, and "*" represents the convolution operation.

Specifically, if $\vec{r}$ is the transverse position in the object plane 344, and the irradiance $I_O R_O$ reflected by the object 312 as a function of the transverse position in the object plane 344 is represented by $I_O R_O(\vec{r})$, $m_{rO}$ is defined by:

$$m_{rO}[I_O R_O(\vec{r})] = I_O R_O(M_{rO} \cdot \vec{r}) \qquad \text{Equation 35}$$

where $M_{rO}$ represents a magnification factor associated with the magnification of the reflected irradiance distribution $R_O I_O(\vec{r})$ from the object plane 344 through a pin-hole in the coded aperture plane 342 onto the image sensor plane 340. Specifically, from simple pin-hole camera theory, the magnification factor $M_{rO}$ is given by:

$$M_{rO} = \frac{d}{z} \qquad \text{Equation 36}$$

Similarly, if $\vec{r}$ is the transverse position in the coded aperture plane 342, and the mask pattern defined by the coded aperture 326 as a function of the transverse position in the coded aperture plane 342 is represented by $A(\vec{r})$, $m_{rA}$ is defined by:

$$m_{rA}[A(\vec{r})] = A(M_{rA} \cdot \vec{r}) \qquad \text{Equation 37}$$

where $M_{rA}$ represents a constant magnification factor associated with the projection of one of the transparent regions or apertures of the mask pattern $A(\vec{r})$ having a diameter w from the coded aperture plane 342 to a diameter W' in the image sensor plane 340. Specifically, the projection W' of one of the transparent regions or apertures of the mask pattern $A(\vec{r})$ having a diameter w onto the image sensor plane 340 is given by:

$$\frac{\frac{w}{2}}{z} = \frac{\frac{W'}{2}}{d+z} \qquad \text{Equation 38}$$

which may be re-arranged to give the desired magnification factor $M_{rA}$ according to:

$$M_{rA} = \frac{W'}{w} = 1 + \frac{d}{z} \qquad \text{Equation 39}$$

The blur function $b_r$ accounts for the projection or blurring of a point source in the object plane 344 onto the image sensor plane 340. Specifically, the degree of blur experienced by a point source in the object plane 344 is given by a blur factor $B_r$ defined by the relation:

$$B_r \propto W' = \frac{wd}{z} \qquad \text{Equation 40}$$

where W' represents a dimension of the spot formed in the image sensor plane 340 as a consequence of the projection of light emitted from a point source in the object plane 344 through a transparent region or aperture of the coded aperture 326 having a dimension of w.

The irradiance distribution $I_S$ of the spatially decoded light which is incident on the image sensor 328 is given by:

$$I_S = m_{rO}\{m_r[I \cdot (1-A)] \cdot R_O\} * m_{rA}(A) * b_r \qquad \text{Equation 41}$$

Assuming that an image of the object 312 is projected onto the image sensor 328, then from pin-hole camera theory based on the geometry shown FIG. 4B, a spot of dimension V in the object plane 344 is imaged to a spot of dimension U in the image sensor plane 340 where:

$$M_t = \frac{V}{U} \qquad \text{Equation 42}$$

and $$M_{rO} = \frac{d}{z} = \frac{1}{M_t} \qquad \text{Equation 43}$$

Hence:

$$m_{rO} = m_t^{-1} \qquad \text{Equation 44}$$

For the case where z>>d:

$$M_{rA} \approx 1 \qquad \text{Equation 45}$$

$$m_{rA}(A) \approx A \qquad \text{Equation 46}$$

$$b_r \approx \delta \qquad \text{Equation 47}$$

and $$\begin{aligned} I_S &\approx I \cdot (1-A) \cdot m_{rO}(R_O) * A \\ &= I \cdot (1-A) * A \cdot m_{rO}(R_O) \\ &= I \cdot (1 * A - A * A) \cdot m_{rO}(R_O) \end{aligned} \qquad \text{Equation 48}$$

Since the transmission function A of the MURA mask pattern defined by the coded aperture 326 is configured such that A*A=δ i.e. such that the auto-correlation of the transmission function A of the MURA mask pattern is, or at least approximates, a two-dimensional Kronecker delta function, the irradiance distribution $I_S$ of the spatially decoded light which is incident on the image sensor 328 is given by:

$$I_S \approx I \cdot (g-\delta) \cdot m_{rO}(R_O) \quad \text{Equation 49}$$

where g=1*A is a pyramid function as shown in FIG. 4C.

In other words, the spatially decoded light detected by the image sensor 328 forms an image which is a product of the magnified reflectivity $m_{rO}(R_O)$ distribution of the object 312 with a predictable function (g−δ) which is independent of the radiant exitance distribution associated with the LEDs 332 and the transmission function A of the MURA mask pattern of the coded aperture 326. Thus, the image $R_O$ of the object 312 may be obtained from knowledge of the function (g−δ), but without any knowledge of the radiant exitance distribution associated with the LEDs 332 and without any knowledge of the transmission function A of the MURA mask pattern of the coded aperture 326. In effect, this means that the image $R_O$ of the object 312 may be obtained more rapidly and with less energy than the deconvolution operations associated with prior art coded aperture imaging techniques.

In contrast to prior art coded aperture imaging systems which rely upon computational techniques to reconstruct an image of the object from spatially encoded light received from the object, the image formed on the image sensor 328 more closely resembles the object 312 compared with the images of objects formed using prior art coded aperture imaging systems. Consequently, use of the optical system 310 eliminates, or at least reduces, the complexity of the image processing required to reconstruct an image of the object 312 compared with prior art coded aperture imaging techniques performed using prior art coded aperture imaging systems. Accordingly, such an optical system 310 may eliminate, or at least reduce, the computational burden associated with imaging relative to prior art coded aperture imaging systems thereby reducing imaging time/improving responsiveness and/or reducing the energy consumption for imaging relative to prior art coded aperture imaging systems.

Although preferred embodiments of the disclosure have been described in terms as set forth above, it should be understood that these embodiments are illustrative only and that the claims are not limited to those embodiments. Those skilled in the art will understand that various modifications may be made to the described embodiments without departing from the scope of the appended claims. For example, those skilled in the art will understand that if a non-Lambertian illuminator were used in place of the Lambertian illuminator 30 in the optical system 10 of the smartphone 2 of FIG. 1A, it is not necessary for the radiant exitance distribution $I_E$ of the non-Lambertian illuminator to be convolved with the transmission function A of the mask pattern of the coded aperture 26 and that the irradiance distribution $I_S$ of the spatially decoded light which is incident on the image sensor 28 would be given by:

$$I_S \approx [I_E \cdot A * A * m_{rO}(b_t)] m_{rO}(R_O) \quad \text{Equation 50}$$

Since the transmission function A of the MURA mask pattern defined by the coded aperture 26 is configured such that A*A=δ i.e. such that the auto-correlation of the transmission function A of the MURA mask pattern is, or at least approximates, a two-dimensional Kronecker delta function, the irradiance distribution $I_S$ of the spatially decoded light which is incident on the image sensor 28 is given by:

$$I_S \approx [I_E \cdot m_{rO}(b_t)] m_{rO}(R_O) \quad \text{Equation 51}$$

For the special case where the radiant exitance distribution $I_E$ generated by the non-Lambertian illuminator is, or resembles, a point source, the radiant exitance distribution $I_E$ may be considered to be a two-dimensional Kronecker delta function such that the irradiance distribution $I_S$ of the spatially decoded light which is incident on the image sensor 28 is given by:

$$I_S \approx m_{rO}(b_t) \cdot m_{rO}(R_O) \quad \text{Equation 52}$$

In other words, the spatially decoded light incident on the image sensor 28 forms an image which is a blurred magnified version of the reflectivity $R_O$ of the object 12 as a function of a transverse position across the object 12, but which is independent of the transmission function A of the MURA mask pattern of the coded aperture 26. Thus, for a point source Lambertian illuminator, the image $R_O$ of the object 12 may be obtained from knowledge of the blur function $b_r$ without any knowledge of the transmission function A of the MURA mask pattern of the coded aperture 26. The blur function $b_r$ may be determined using any of the methods described above.

Although the mask pattern defined by the coded apertures 26, 126, 226 is a MURA mask pattern, other mask patterns may be possible, provided the mask pattern is configured such that an auto-correlation of the transmission function of the mask pattern is, or resembles, the Kronecker delta function δ which includes a central peak or lobe, but which includes no secondary peaks or side-lobes, or which includes a central peak or lobe and one or more secondary peaks or side-lobes which have an amplitude which is less than 1/10 an amplitude of the central peak or lobe, which is less than 1/100 an amplitude of the central peak or lobe, or which is less than 1/1000 an amplitude of the central peak or lobe.

The mask pattern may be a Uniformly Redundant Array (URA) mask pattern.

The coded aperture may comprise a phase mask.

The coded aperture may be diffractive.

The coded aperture 26 may be reconfigurable. For example, the coded aperture 26, 126, 226 may be formed from, or comprise, a plurality of reconfigurable elements for this purpose, wherein each element is reconfigurable between a transparent state in which light from the Lambertian illuminator 30, 130, 230 can pass through the element and a blocking or absorbing state in which light from the Lambertian illuminator 30, 130, 230 is blocked or absorbed. For example, the coded aperture 26, 126, 226 may be formed from, or comprise, an LCD array.

The optical filter 27, 127, 227 may comprise, or be formed from, a dye-based polymer material. The optical filter 27, 127, 227 may comprise, or be formed from, antimony doped tin oxide.

The image sensor 28, 128, 228, 328 may be configured to detect infrared light.

The image sensor 28, 128, 228, 328 may be configured to have a lower sensitivity to ambient visible light reflected from the object and a higher sensitivity to infrared light reflected from the object The spatially encoded light 22, 322 may be modulated temporally with a pre-defined temporal modulation so that the spatially decoded light is also modulated temporally with the pre-defined temporal modulation and wherein the image sensor 28, 328 is configured to distinguish between the temporally modulated spatially decoded light and light which is temporally unmodulated and/or light which is modulated temporally with a temporal modulation which is different to the pre-defined temporal modulation.

Rather than using one or more infrared LEDs 32, 132, 232, 332 as illuminator, other types of optical emitters may be used.

Each optical emitter may be modulated temporally with a pre-defined temporal modulation so that the spatially decoded light is also modulated temporally with the pre-defined temporal modulation.

The spatial encoding arrangement 20, 120, 220, 320 may comprise a plurality of optical emitters and different optical emitters of the plurality of optical emitters may be operated at different times so as to illuminate an object from different directions and/or to illuminate different parts of an object at different times to thereby form different images of the object when viewed from different directions and/or to thereby form images of different parts of the object.

The optical system 10, 110, 210, 310 may be incorporated into an electronic device of any kind.

The optical system 10, 110, 210, 310 may be incorporated into a mobile electronic device.

The optical system 10, 110, 210, 310 may be incorporated into a mobile phone, a cell phone, a smartphone, a tablet, a laptop, or a wearable electronic device such as an electronic watch or an electronic wristband.

Each feature disclosed or illustrated in the present specification may be incorporated in any embodiment, either alone, or in any appropriate combination with any other feature disclosed or illustrated herein. In particular, one of ordinary skill in the art will understand that one or more of the features of the embodiments of the present disclosure described above with reference to the drawings may produce effects or provide advantages when used in isolation from one or more of the other features of the embodiments of the present disclosure and that different combinations of the features are possible other than the specific combinations of the features of the embodiments of the present disclosure described above.

The skilled person will understand that in the preceding description and appended claims, positional terms such as 'above', 'along', 'side', etc. are made with reference to conceptual illustrations, such as those shown in the appended drawings. These terms are used for ease of reference but are not intended to be of limiting nature. These terms are therefore to be understood as referring to an object when in an orientation as shown in the accompanying drawings.

Use of the term "comprising" when used in relation to a feature of an embodiment of the present disclosure does not exclude other features or steps. Use of the term "a" or "an" when used in relation to a feature of an embodiment of the present disclosure does not exclude the possibility that the embodiment may include a plurality of such features.

The use of reference signs in the claims should not be construed as limiting the scope of the claims.

LIST OF REFERENCE NUMERALS 2 smartphone;
10 optical system;
12 object;
20 spatial encoding arrangement;
22 spatially encoded light;
24 initial spatial distribution of the spatially encoded light;
26 coded aperture;
27 optical filter;
28 image sensor;
30 illuminator;
32 LED;
40 illuminator/image sensor plane;
42 coded aperture plane;
44 object plane;
102 smartphone;
110 optical system;
120 spatial encoding arrangement;
126 coded aperture;
127 optical filter;
128 image sensor;
130 illuminator;
32 LED;
150 touchscreen;
202 smartphone;
210 optical system;
220 spatial encoding arrangement;
226a coded aperture;
226b further coded aperture;
227 optical filter;
228 image sensor;
230 illuminator;
232 LED;
302 smartphone;
310 optical system;
312 object;
320 spatial encoding arrangement;
322 spatially encoded light;
324 initial spatial distribution of the spatially encoded light;
326 coded aperture;
327 optical filter;
328 image sensor;
330 illuminator;
332 LED;
340 illuminator/image sensor plane;
342 coded aperture plane;
344 object plane; and
360 lens elements.

The invention claimed is:

1. An optical system for imaging an object, the optical system comprising:
a spatial encoding arrangement for generating spatially encoded light with an initial spatial distribution;
a coded aperture defining a mask pattern which is based on the initial spatial distribution of the spatially encoded light; and
an image sensor,
wherein the optical system is configured such that, in use, the spatial encoding arrangement directs the spatially encoded light onto the object so that the object reflects at least a portion of the spatially encoded light to form reflected light, the reflected light is directed through the coded aperture to form spatially decoded light, the spatially decoded light is directed onto the image sensor so as to form an image thereon, and the image sensor detects the image, and
wherein the spatial encoding arrangement comprises a plurality of optical emitters, wherein the plurality of optical emitters are spatially arranged so as to define the initial spatial pattern of the spatially encoded light, and wherein the mask pattern defined by the coded aperture is the inverse of the initial spatial pattern of the spatially encoded light defined by the spatial arrangement of the plurality of optical emitters.

2. The optical system as claimed in claim 1, wherein the image detected by the image sensor comprises at least one of:
   an image of the object;
   a sharp or focused image of the object;
   a blurred image of the object;
   a scaled image of the object; or a product of a scaled image of the object with a function which is independent of the mask pattern defined by the coded aperture.

3. The optical system as claimed in claim 1, wherein the mask pattern comprises a binary mask pattern and/or wherein the coded aperture comprises a plurality of opaque regions and a plurality of transparent regions or apertures which together define the mask pattern.

4. The optical system as claimed in claim 1, wherein the coded aperture is diffractive and/or wherein the coded aperture comprises a phase mask.

5. The optical system as claimed in claim 1, wherein the mask pattern is configured such that an auto-correlation of the mask pattern is equal to, or resembles, a Kronecker delta function δ which includes a central peak or lobe, but which includes no secondary peaks or side-lobes, or which includes a central peak or lobe and one or more secondary peaks or side-lobes which have an amplitude which is less than 1/10 an amplitude of the central peak or lobe, which is less than 1/100 an amplitude of the central peak or lobe, or which is less than 1/1000 an amplitude of the central peak or lobe.

6. The optical system as claimed in claim 1, wherein the mask pattern is a Uniformly Redundant Array (URA) mask pattern or a Modified Uniformly Redundant Array (MURA) mask pattern.

7. The optical system as claimed in claim 1, wherein the coded aperture is reconfigurable, and wherein the coded aperture is formed from, or comprises, an LCD array.

8. The optical system as claimed in claim 1, wherein at least one of:
   the optical system is configured to reject or block ambient light reflected from the object;
   the optical system comprises an optical filter in front of the image sensor for rejecting or blocking ambient light reflected from the object;
   the image sensor is configured to detect infrared light;
   the image sensor is configured to have a lower sensitivity to visible light and a higher sensitivity to infrared light; or
   the spatially encoded light and the spatially decoded light both comprise, or are formed from, infrared light, the image sensor is configured to detect infrared light, and the optical system comprises an optical filter in front of the image sensor for rejecting or blocking visible light and for transmitting infrared light.

9. The optical system as claimed in claim 1, wherein at least one of:
   each optical emitter comprises a Lambertian optical emitter or a non-Lambertian optical emitter;
   each optical emitter comprises an LED; or
   each optical emitter is configured to emit infrared light.

10. The optical system as claimed in claim 1, wherein each optical emitter of the plurality of optical emitters is operable independently of the one or more other optical emitters of the plurality of optical emitters.

11. The optical system as claimed in claim 1, wherein the one or more optical emitters and the image sensor are co-planar, for example and wherein the one or more optical emitters and the image sensor are mounted or formed on the same substrate.

12. The optical system as claimed in claim 1, wherein each optical emitter of the plurality of optical emitters absorbs or blocks the reflected light so that each optical emitter of the plurality of optical emitters defines a corresponding opaque or blocking region of the coded aperture and, optionally, aperture, and wherein each optical emitter of the plurality of optical emitters is mounted, or formed, on a substrate which is transparent to the light emitted by the plurality of optical emitters.

13. The optical system as claimed in claim 1, wherein the spatial encoding arrangement comprises a plurality of lens elements, wherein each lens element is aligned in front of a corresponding optical emitter so as to at least partially focus or collimate light emitted by the corresponding optical emitter.

14. An electronic device comprising the optical system as claimed in any preceding claim, for example claim 1, wherein the electronic device comprises a mobile electronic device, wherein the mobile electronic device comprises a user interface accessible by way of a display or a touchscreen, wherein the one or more optical emitters and the image sensor are located behind the user interface and the object is located in front of the user interface.

15. An optical system for imaging an object, the optical system comprising:
   a spatial encoding arrangement for generating spatially encoded light with an initial spatial distribution;
   a coded aperture defining a mask pattern which is based on the initial spatial distribution of the spatially encoded light; and
   an image sensor,
   wherein the optical system is configured such that, in use, the spatial encoding arrangement directs the spatially encoded light onto the object so that the object reflects at least a portion of the spatially encoded light to form reflected light, the reflected light is directed through the coded aperture to form spatially decoded light, the spatially decoded light is directed onto the image sensor so as to form an image thereon, and the image sensor detects the image,
   wherein the spatial encoding arrangement comprises the coded aperture, and wherein the optical system is configured such that, in use, the one or more optical emitters emit light which passes through the coded aperture to form the spatially encoded light such that the initial spatial pattern of the spatially encoded light is defined by the mask pattern of the coded aperture.

16. A method for imaging an object, the method comprising:
   directing spatially encoded light with an initial spatial distribution onto an object so that the object reflects at least a portion of the spatially encoded light to form reflected light;
   directing the reflected light through a coded aperture to form spatially decoded light, wherein the coded aperture defines a mask pattern which is based on the initial spatial distribution of the spatially encoded light; and
   directing the spatially decoded light onto an image sensor, wherein the spatially decoded light forms an image on the image sensor and the image sensor detects the image, and
   wherein the initial spatial pattern of the spatially encoded light is defined by a spatial arrangement of a plurality of optical emitters, and wherein the mask pattern defined by the coded aperture is the inverse of the initial spatial pattern of the spatially encoded light defined by the spatial arrangement of the plurality of optical emitters.

* * * * *